United States Patent

[11] 3,629,799

| | | |
|---|---|---|
| [72] | Inventor | Harold Birtwistle<br>Burnley, England |
| [21] | Appl. No. | 876,954 |
| [22] | Filed | Nov. 14, 1969 |
| [45] | Patented | Dec. 21, 1971 |
| [73] | Assignee | Joseph Lucas (Industries) Limited<br>Birmingham, England |
| [32] | Priority | Nov. 22, 1968 |
| [33] | | Great Britain |
| [31] | | 55,519/68 |

[54] LAMP FAILURE WARNING SYSTEMS
1 Claim, 1 Drawing Fig.

[52] U.S. Cl. .................................................. 340/52 R, 340/251
[51] Int. Cl. .................................................. G08b 21/00, B60q 1/04
[50] Field of Search .......................................... 340/251, 52; 315/82, 83

[56] References Cited
UNITED STATES PATENTS

| 1,945,528 | 2/1934 | Gordon | 340/251 UX |
| 2,001,135 | 5/1935 | Harmon | 340/251 UX |
| 2,220,100 | 11/1940 | Hack | 340/251 UX |

*Primary Examiner*—John W. Caldwell
*Assistant Examiner*—Daniel Myer
*Attorney*—Holman & Stern ABSTRACT: In a lamp failure warning system first and second windings are provided, each in two parts. A circuit to the first winding is completed by way of its midpoint, through one part of the winding in one lamp, with another circuit completed through the midpoint, of the other part of the winding and another lamp. Normally the parts of the winding produce a balanced magnetic field, but if a lamp fails the field is unbalanced and a contact is operated to energize a warning lamp. The other winding serves the same function to another pair of lamps.

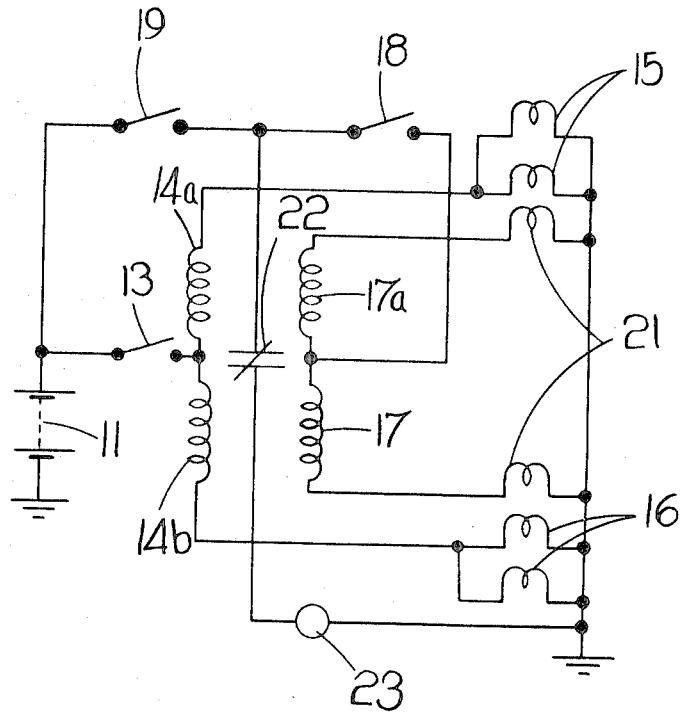

LAMP FAILURE WARNING SYSTEMS

This invention relates to lamp failure warning systems for road vehicles.

A system according to the invention comprises in combination first and second terminals for connection to the battery of the vehicle, a first winding, a first control switch connected between the midpoint of the first winding and the first terminal, a first pair of lamps connected between the ends of the first winding respectively and the second terminal, a second winding, a second control switch connected between the midpoint of the second winding and the first terminal, a second pair of lamps connected between the ends respectively of the second winding and the second terminal, the windings being designed so that if one of the first pair of lamps fails there will be a magnetic unbalance between the parts of the first winding which causes operation of a pair of contacts to energize a warning lamp, the same pair of contacts being operated by any magnetic unbalance between the parts of the second winding if one of the second pair of lamps fails.

The accompanying drawing is a circuit diagram illustrating one example of the invention.

Referring to the drawing, the battery 11 of a road vehicle has one terminal earthed and its live terminal connected through the lighting switch 13 of the vehicle to the midpoint of a winding 14a, 14b, the portions of which are oppositely wound with the portion 14a connected to the terminal 12 through the side lamps 15 of the vehicle in parallel, and the portion 14b connected to earth through the tail lamps 16 of the vehicle in parallel. The system further includes a second winding 17a, 17b the portions of which are oppositely wound with the midpoint of the winding connected to the terminal 11 through the brake lamp switch 18 and the ignition switch 19 of the vehicle in series, the portion 17a, 17b being connected to earth through the brake lamps 21 of the vehicle respectively. The junction of the switches 18 and 19 is connected through a normally open reed switch 22 controlled by the windings 14, 17 and a warning lamp 23 to earth.

In use, assuming the ignition switch 19 is closed, then whenever the switch 18 is closed, the lamps 21 are energized, but the magnetic field produced by the two halves of the winding 17 is balanced and so the contact 22 remains open. Similarly, whenever the switch 13 is closed, the magnetic field produced by the two halves of the winding 14 is balanced and so the switch 22 remains open. Thus the contacts 22 remain open whether one or both of the switches 13 and 18 are closed. However, should one of the lamps 15, 16 fail, then as soon as the associated switch 13 is closed, there will be a magnetic unbalance between the portions 14a, 14b which will close the contacts 22, thereby energizing the warning lamp 23. Similarly, closing of the switch 18 when a lamp 21 has failed will result in an unbalance between the portions 17a, 17b, so that the contacts 22 again close to energize the lamp 23.

Having thus described my invention what I claim as new and desire to secure by Letters Patent is:

1. A lamp failure warning system comprising in combination first and second terminals for connection to the battery of the vehicle, a first winding having a midpoint defining two oppositely wound parts, a first control switch connected between the midpoint of the first winding and the first terminal, a first pair of lamps respectively connected from opposite ends of the first winding to the second terminal, a second winding having a midpoint defining two oppositely wound parts, a second control switch connected between the midpoint of the second winding and the first terminal, a second pair of lamps respectively connected from opposite ends of the second winding to the second terminal, electrical contact means in circuit between the battery and a warning lamp, said contact means being disposed in the magnetic field of and between said first and second windings for operation upon unbalance of the respective magnetic fields produced by the oppositely wound parts of both said first and second windings, operation of said contact means energizing said warning lamp, whereby simultaneous monitoring of both said first and second lamp pairs is effected.

* * * * *